United States Patent
Kohout et al.

(10) Patent No.: US 11,985,154 B2
(45) Date of Patent: May 14, 2024

(54) COMPREHENSIBLE THREAT DETECTION

(71) Applicant: Cisco Technology, Inc., San Jose, CA (US)

(72) Inventors: Jan Kohout, Roudnice nad Labem (CZ); Martin Kopp, Komarov (CZ); Kyrylo Shcherbin, Prague (CZ); Jaroslav Hlavac, Prague (CZ); Cenek Skarda, Prague Bechovice (CZ)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 17/668,639

(22) Filed: Feb. 10, 2022

(65) Prior Publication Data

US 2023/0133892 A1 May 4, 2023

Related U.S. Application Data

(60) Provisional application No. 63/271,771, filed on Oct. 26, 2021.

(51) Int. Cl.
*H04L 9/40* (2022.01)
(52) U.S. Cl.
CPC ................. *H04L 63/1425* (2013.01)
(58) Field of Classification Search
CPC ........... H04L 63/1425; H04L 2463/121
See application file for complete search history.

(56) References Cited

U.S. PATENT DOCUMENTS

| | | | |
|---|---|---|---|
| 10,785,243 B1 | 9/2020 | Han et al. | |
| 2017/0134415 A1* | 5/2017 | Muddu | H04L 43/00 |
| 2017/0366582 A1* | 12/2017 | Kothekar | H04L 63/101 |
| 2018/0027002 A1 | 1/2018 | Rodeck et al. | |
| 2019/0098032 A1* | 3/2019 | Murphey | G06F 9/4498 |
| 2019/0327248 A1* | 10/2019 | Lord | G06N 5/04 |
| 2021/0126938 A1 | 4/2021 | Trost et al. | |
| 2021/0203673 A1 | 7/2021 | dos Santos et al. | |
| 2021/0250365 A1* | 8/2021 | Atkinson | H04L 63/20 |

* cited by examiner

*Primary Examiner* — Huan V Doan
(74) *Attorney, Agent, or Firm* — Lee & Hayes P.C.

(57) ABSTRACT

Techniques for combining threat-related events associated with different modalities to provide a complete insight into cyber attack life cycles. The techniques may include receiving telemetry data associated with one or more modalities and detecting, based at least in part on the telemetry data, one or more abnormal events associated with security incidents. The one or more abnormal events may include at least a first abnormal event associated with a first modality and a second abnormal event associated with a second modality. The techniques may also include determining that an entity associated with the abnormal events is a same entity and, based at least in part on the entity comprising the same entity, determining that a correlation between the abnormal events is indicative of a security incident. Based at least in part on the correlation, an indication associated with the security incident may be output.

20 Claims, 5 Drawing Sheets

COMPREHENSIBLE THREAT DETECTION

RELATED APPLICATIONS

This application claims priority to U.S. Provisional Application No. 63/271,771, filed on Oct. 26, 2021, which is incorporated herein by reference in its entirety and for all purposes.

TECHNICAL FIELD

The present disclosure relates generally to techniques for combining detected events from different sources of data to provide a complete insight into cyber attack life cycles.

BACKGROUND

Detecting security incidents in computer networks is a complex task, which can be composed of many particular observations and detections that need to be combined in order to determine the whole story. However, existing methods for automatically detecting security incidents operate only in a narrow scope, limiting them to capture only fragments of the evidence of malware's presence. Consequently, domain experts and threat analysts may invest significant amounts of time into almost every investigation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
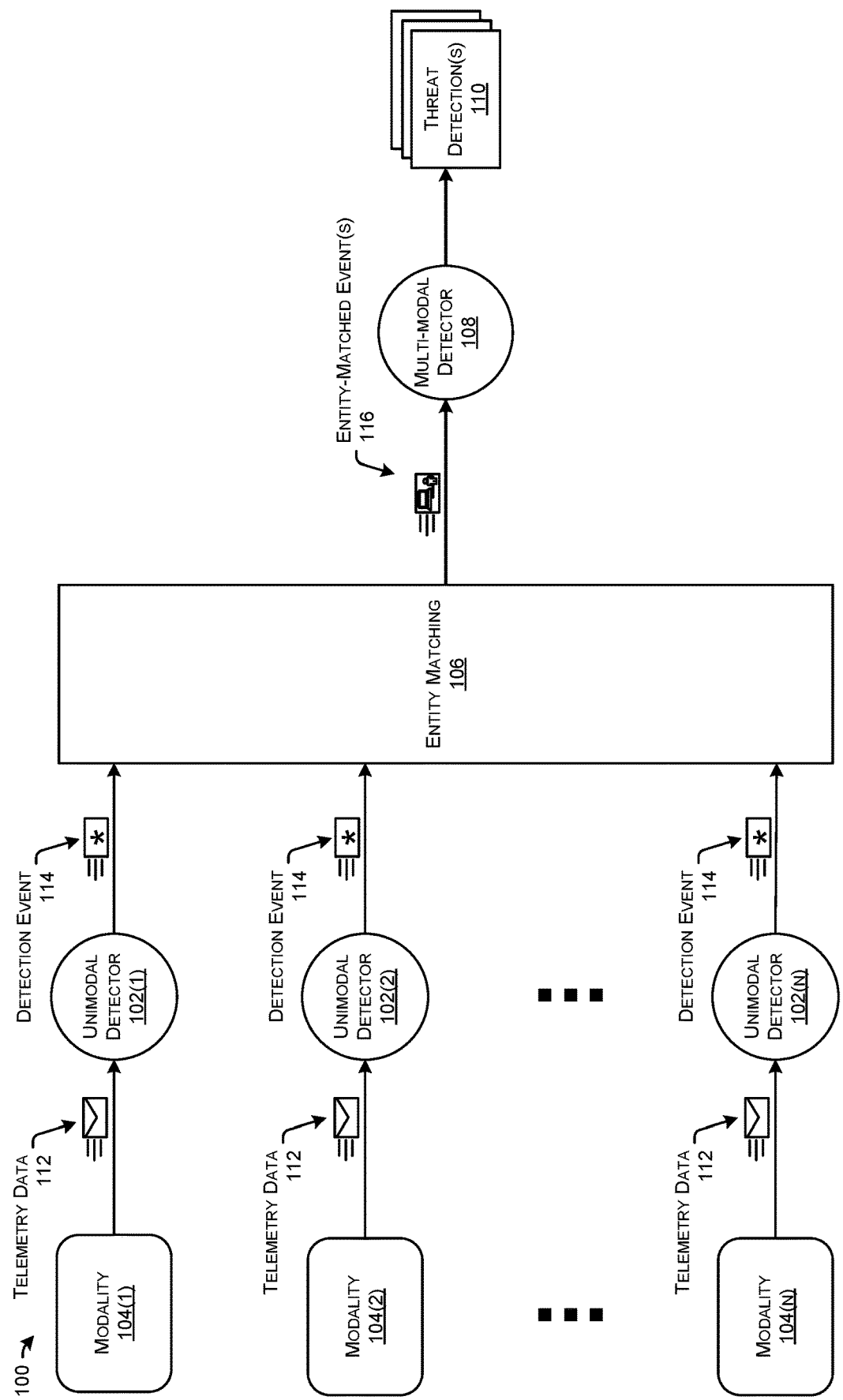
FIG. 1 illustrates an example architecture that may be used to implement various aspects of the threat detection techniques described herein.

This disclosure describes techniques for combining detected events from different sources of data to provide a complete insight into cyber attack life cycles. By way of example, and not limitation, a method according to the technologies described herein may include receiving telemetry data associated with one or more modalities, the one or more modalities including at least a first modality and a second modality, the second modality different from the first modality. In some examples, the method may also include detecting, in the telemetry data, one or more abnormal events associated with security incidents, the one or more abnormal events including at least a first abnormal event associated with the first modality and a second abnormal event associated with the second modality. The method may also include determining that an entity associated with each one of the first abnormal event and the second abnormal event is a same entity, and based at least in part on the entity comprising the same entity, determining that a correlation between the first abnormal event and the second abnormal event is indicative of a security incident. Based at least in part on the correlation, an indication of the security incident may be output.

Additionally, the techniques described herein may be performed as a method and/or by a system having non-transitory computer-readable media storing computer-executable instructions that, when executed by one or more processors, performs the techniques described above.

Example Embodiments

As discussed above, detecting security incidents in computer networks is a complex task, which can be composed of many particular observations and detections that need to be combined in order to determine the whole story. However, existing methods for automatically detecting security incidents operate only in a narrow scope, limiting them to capture only fragments of the evidence of malware's presence. Consequently, domain experts and threat analysts may invest significant amounts of time into almost every investigation.

Take, for example, a security breach in a company's internal network. The incident might start by an employee of the company opening a phishing e-mail, which infects the employee's machine and then spreads in the company's network using lateral movement techniques to other endpoints. The breach may culminate by exfiltration of sensitive information outside the company's environment, deploying spyware tools on employees' computers, or even disabling the company's critical infrastructure and demanding ransom. In such an example, each one of these phases can manifest itself by different means and is reflected in different types of telemetry data (e.g., a different modality). In the world of intrusion detection systems (IDS), such modalities may be logs from web proxies, file executions logs, firewall logs, and/or e-mail data. However, the problem of multi-modal analysis is not limited to IDS only. For example, proper e-mail analysis is a multi-modal problem on its own as e-mails may contain, apart from the main textual message, hyperlinks, images, and sender information. Moreover, due to the complex nature of threats, alerts generated by detection systems need to be descriptive and expressive enough such that security analysts can easily understand them and recognize the expansion of the threat in the protected environment. As such, detecting malicious activities in a corporate environment involves identifying what is happening (e.g., which type of threat was detected, what actions were performed, etc.), where it is happening (e.g., which user, device or part of the infrastructure is affected) and when the detected activity occurred.

This disclosure is directed to, among other things, techniques for combining detected events (e.g., threat-related and other events) from different modalities (e.g., sources of data) in order to provide a complete insight into the life cycle of a cyber-security attack. Presenting a full story gathered across multiple modalities, such as web proxy logs, e-mail events, binary executions, and the like, significantly reduces the time needed for analysis. Additionally, presenting the full story can also allow detection of new threats and other cyber-attacks that would be missed otherwise.

In some examples, the techniques described herein may include an X-domain detection framework for processing multiple telemetry sources (e.g., logs of network connections, results of binary inspections, analysis of email messages, etc.) such that it is capable of detecting new threats based on the combination of weak indicators. Additionally, the proposed framework may provide inherently comprehensible detections. In general, K different types of modalities (e.g., input data sources) can be considered, where K represents any number greater than or equal to one. Using these modalities, the input for the detection task then consists of K datasets of type:

$$D_k = \{(t_i^k, d_i^k) | i \in \mathbb{N} \wedge i \leq n_k\}$$

$$k \in \{1, 2, \ldots, K\}, n_k = \|D\|,$$

where the dataset $D_k$ originates from the k-th modality. The variables $t_i^k$ and $d_i^k$ represent the timestamp and the data associated with the i-th object in the k-th dataset, respectively.

In some examples, no restrictions may be put in place on the structure of the data at this point as the datasets may come from different modalities and, thus, can be completely heterogeneous. For example, if the k-th modality contains logs from a network sensor, then the data in that dataset can be in a form of NetFlow records together with their timestamps of capture. Additionally, $\mathcal{D}_k$ may represent a set of all possible datasets originating from the k-th modality. The goal may be to design a system that implements a function:

$$f: \mathcal{D}_1 \times \mathcal{D}_2 \times \ldots \times \mathcal{D}_K \mapsto 2^{T \times E \times Y}$$

In summary, the function $f$ may take K datasets from the available modalities as an input and output a list of detections, where each detection contains information about the type of threat, affected entity, and time of detection. In practice, the output may also contain metadata (e.g., transferred bytes or a registry key that was changed) associated with the detection that might be useful for a security analyst working with the system's output to verify the detection and to take remediation actions.

By way of example, and not limitation, a method according to the techniques described herein may include techniques of receiving telemetry data associated with one or more modalities. In some examples, the one or more modalities may include a first modality, a second modality, a third modality, and so forth. In some examples, each modality may be different from each other. For instance, the first modality may be associated with a network connection log, the second modality may be associated with email activity logs, the third modality may be associated with endpoint logs, etc. In some examples, the telemetry data may comprise or be indicative of web proxy logs, file execution logs, firewall logs, network connection logs (e.g., Cisco's StealthWatch, NGFW, etc.), endpoint logs (e.g., binary executions, file changes from anti-virus engines, operating system logs, etc.), email activity logs, instant messaging logs, or the like.

In some examples, the techniques may include detecting, based at least in part on the telemetry data, one or more abnormal events (e.g., threat-related events) associated with security incidents. In some examples, the one or more abnormal events can include a first abnormal event associated with the first modality, a second abnormal event associated with the second modality, and so forth. In some examples, abnormal events on each modality may be detected by a unimodal detector that is specific to that modality. For instance, the first abnormal event may be detected by a first unimodal detector that is specific to the first modality, the second abnormal event may be detected by a second unimodal detector that is specific to the second modality, and so forth.

In some examples, when abnormal events are detected, the different abnormal events may be assigned to an entity that they originated from. In some examples, the entities to which abnormal events may be assigned can include, but is not limited to, a specific server, a specific device, a specific user, a specific account (e.g., email or other user account), a specific group of devices, or the like. For instance, the abnormal events may be assigned based on a mapping between endpoint identifiers associated with the one or more modalities and network addresses associated with the entity. In some instances, the techniques may also include determining that an entity associated with multiple abnormal events is a same entity. For instance, the first abnormal event, the second abnormal event, etc. may be associated with the same entity (e.g., the first abnormal event, second abnormal event, etc. are all associated with (e.g., originated from) a same server, user device, account, etc.).

In some examples, based at least in part on multiple abnormal events being associated with the same entity, a determination may be made as to whether the multiple abnormal events are indicative of a security incident (e.g., a cyber-security attack). For instance, a correlation may be determined between the first abnormal event, the second abnormal event, the third abnormal event, and so forth, and that correlation may be strongly indicative of a presence of a security incident affecting the entity. Additionally, or alternatively, in some example a correlation may not exist between the abnormal events that is indicative of a security incident. In other words, these abnormal events that are not indicative of a security incident can be classified as otherwise normal behavior.

In some examples, machine-learned models and other machine-learning techniques may be utilized to determine whether multiple abnormal events associated with a same entity are indicative of a security incident. For instance, data associated with the abnormal events may be input, into a machine-learned model, and an output may be received from the machine-learned model indicating that the abnormal event(s) are indicative of an ongoing security incident.

In some examples, an indication may be output to indicate the presence of the security incident. For instance, the indication may be sent to network administrators associated with a company's network infrastructure so that corrective action can be taken. In some examples, the techniques described herein can be performed by one or more devices operating in a cloud-computing environment. In some examples, the techniques described herein can be available as a service to, for instance, companies or other entities for protection of their infrastructure.

According to the technologies described herein for combining detected events from different modalities to provide a complete insight into the life cycle of a cyber-security attack, the time needed for analysis to determine whether threat-related events are indicative of cyber-security attacks can be reduced. Additionally, presenting the full story associated with cyber-attacks can also allow for detection of new threats and other cyber-attacks that would be missed otherwise. In other words, the technologies described herein enable a computer to perform operations that were not previously performable by a human or a computing device. Additionally, the techniques described herein may be used to determine the complete life cycle of various different types of cyber-security attacks, including those attacks and events associated with malware (e.g., viruses, trojans, worms, ransomware, spyware, etc.), phishing attacks (e.g., spear phishing, whaling, pharming, etc.), Man-in-the-Middle (MitM) attacks, Denial-of-Service (DOS) attacks, SQL injections, zero-day exploits, password attacks, cross-site scripting, rootkits, Internet of Things (IoT) attacks, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may be used to implement various aspects of the threat detection techniques described herein. In some examples, portions of the architecture 100 may reside in or be hosted on resources of a cloud-computing network that is remote from the entities and/or modalities 104 that the architecture 100 is monitoring.

In some examples, one or more specific unimodal detector(s) 102(1)-102(N) (hereinafter referred to collectively as "unimodal detectors 102") (where N represents any number greater than or equal to 1) may generate detection events 114 (e.g., threat-related detections) on one or more individual input modality(s) 104(1)-104(N) (hereinafter referred to collectively as "modalities 104") (where N represents any number greater than or equal to 1). In some examples, the unimodal detectors 102 may receive telemetry data 112 associated with the modalities 104. For instance, the first unimodal detector 102(1) may receive telemetry data 112 associated with the first modality 104(1), the second unimodal detector 102(2) may receive telemetry data 112 associated with the second modality 104(2), and so forth. In some examples, the telemetry data 112 received from the individual input modalities 104 may be processed by respective unimodal detectors 102. In some examples, the unimodal detectors 102 may produce modality-specific detection events 114 based on processing the data.

In some examples, the complexity of the unimodal detectors 102 may vary from simple rules up to a multi-layered detection engine. For instance, in some examples the unimodal detectors 102 may be signature-based in that they produce detection events by matching behavioral signatures handcrafted by a domain expert. Additionally, or alternatively, the unimodal detectors 102 may be classifier-based such that they generate events by supervised classifiers trained on historical data. Additionally, or alternatively, the unimodal detectors 102 may be anomaly-based such that they leverage statistical, volumetric, proximity, targeted, and domain-specific anomaly detectors. Additionally, or alternatively, the unimodal detectors 102 may be contextual event-based and may capture various network or endpoint behaviors to provide additional context, such as file download events, direct access on raw IP, and/or software updates.

In some examples, the unimodal detectors 102 may implement various detection methods developed for individual modalities. For instance, the unimodal detectors 102 may utilize traditional, rule-based systems which generate events based on matched hard-coded patterns. Additionally, or alternatively, the unimodal detectors 102 may include anomaly detection algorithms or supervised classifiers. The large variety of anomaly detection methods applicable in the security domain can employ simple statistical detectors or probabilistic models. In some examples, the unimodal detectors 102 may include random forest classifiers, similarly as artificial neural networks. However, even much simpler yet computationally effective methods may be relevant and utilized by the unimodal detectors 102 because even weak detections can contribute to the final detections produced by the multi-modal detector 108. In some examples, each one of the unimodal detectors 102 may transform the data source according to its needs and emit an event if the triggering criteria is met. In some examples, each of the multimodal detectors 102 may persist each detection event 114 to an events store, where it can be later evaluated by the multi-modal detector 108 to produce a final security detection.

In some examples, the modalities 104 may represent data gathered from different telemetry sources, such as network connection logs, endpoint logs (e.g., binary executions, file changes from antivirus engines, operating system logs, etc.), e-mail activity logs, instant messaging logs, other sources of log data, and the like. In some examples, different modalities 104 may be associated with a same entity. In some examples, the modalities 104 may include a first modality 104(1), a second modality 104(2), and so forth. In some examples, each modality 104 may be different from each other. For instance, the first modality 104(1) may be associated with a network connection log, the second modality 104(2) may be associated with email activity logs, the nth modality 104(N) may be associated with endpoint logs, etc. In some examples, the telemetry data 112 may comprise or be indicative of web proxy logs, file execution logs, firewall logs, network connection logs (e.g., Cisco's StealthWatch, NGFW, etc.), endpoint logs (e.g., binary executions, file changes from anti-virus engines, operating system logs, etc.), email activity logs, instant messaging logs, or the like.

In some examples, the entity matching component 106 may match detection events 114 from the unimodal detectors 102 to assign their outputs to the same entities (e.g., same devices, users, servers, etc.). For instance, the entity matching component 106 may output one or more entity-matched event(s) 116 based at least in part on the detection events 114. In some examples, the entity matching component 116 may determine which entity that a detection event 114 is associated with and assign that detection event 114 to that entity. In some examples, each entity may be represented by different means in each modality 104 and the entity matching component 106 may unify the entities' representations and assign detection events 114 from different modalities 104 to the correct entities.

In some examples, a same entity can be observed simultaneously in multiple modalities 104, represented by different identifiers. As such, it may be the responsibility of the entity matching component 106 to link the data sources together. For example, the entity matching component 106 may examine metadata about entities and the telemetry feeds to construct a unified view of the entities in the observed environment's local and global contexts. In some examples, the entity matching component 106 may associate a person to their laptop, the laptop to an email and browser processes, and/or their corresponding assigned network addresses, thus linking the telemetry data 112 and the detection events 114 to a single entity. This entity may be referred to as a cross-modal entity.

In the example architecture 100, the entity matching component 106 may construct a mapping between endpoint IDs and IP addresses. In some examples, an entity matching algorithm used by the entity matching component 106 may prefer precision over the completeness of IP space coverage, and IP addresses used by multiple endpoints concurrently (e.g., endpoints located in different subnets with the same IP ranges) may be discarded. In some instances, the mapping may be used to associate detections from network modalities 104 with given IP addresses and timestamps to the cross-modal entity. In some examples, the endpoint-modality entity may be equal to the cross-modal entity—the unique endpoint ID.

In some examples, the entity matching component 106 may assign the different detection events 114 to an entity that they originated from. In some examples, the entities to which detection events 114 may be assigned can include, but is not limited to, a specific server, a specific device, a specific user, a specific account (e.g., email or other user account), a specific group of devices, or the like. For instance, the detection events 114 may be assigned based on a mapping between endpoint identifiers associated with the one or more modalities 104 and network addresses associated with the entity. In some instances, the entity matching component 106 may determine that a single entity is associated with multiple detection events 114. For instance, a first detection event 114, a second detection event 114, etc. may be associated with the same entity.

In some examples, the multi-modal detector 108 may produce threat detection(s) 110 for each entity based at least in part on the entity-matched event(s) 116 produced by the entity matching component 106. The multi-modal detector 108, in some examples, may work at the level of detections from individual modalities 104 with unified representations of entities, and may search for suspicious combinations of unimodal detections that are signals of a security incident. If the multi-modal detector 108 determines that a security incident is present, it may output one or more threat detections 110. In some examples, the threat detection(s) 110 may indicate a type of cyber-security attack that is affecting the entity(s), the entity(s) affected by the attack, when the attack began, how to remedy the attack, the severity of the attack, and the like.

In some examples, the multi-modal detector 108 may be a component which may operate on observations from bounded time window and multiple modalities that were already associated with the cross-modal entity. In some examples, the multi-modal detector 108 may be a single rule mapping specific observation directly on a threat detection. This approach may be sufficient if the observation is already significant enough on its own. However, some threats can be identified with high probability only by correlation of multiple observations from multiple modalities 104. In this case, the multi-modal detector 108 may be defined by a complex rule or set of rules. In some examples, the rule(s) itself may be explicit or encoded by, for instance, a neural network.

Figure 2:
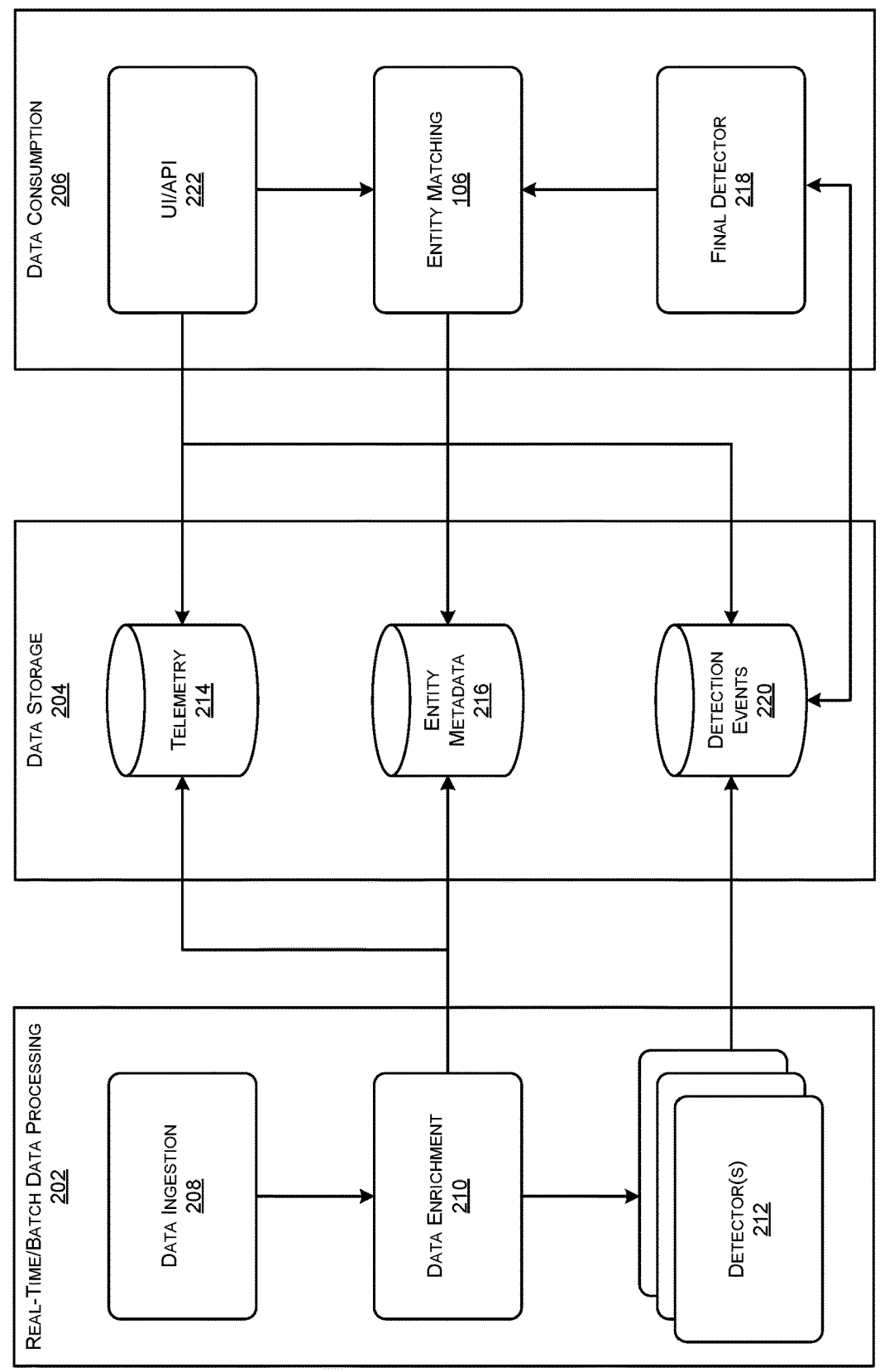
FIG. 2 illustrates an example system that may be used to implement various aspects of the threat detection techniques described herein.

FIG. 2 illustrates an example system 200 that may be used to implement various aspects of the threat detection techniques described herein. In some examples, the system 200 may logically include a real-time/batch data processing portion 202, a data storage portion 204, and a data consumption portion 206.

The data ingestion component 208 may serve as the gateway to the system 200. The data ingestion component 208 may integrate with the source data providers using both push-based and pull-based strategies. In some examples, the data in various formats may be validated, filtered, transformed, and enhanced with contextual or global intelligence information by the data enrichment component 210. Additionally, the data may be catalogued and persisted to the telemetry data store 214 and the entity metadata store 216 for further reference by downstream components and/or human analysts.

In some examples, the example system 200 may be implemented with modalities such as network telemetry, endpoint telemetry, and the like. The network data used may additionally be associated with different types, such as web proxy logs, Net-Flows (which may include fields such as IP addresses for the client and the contacted server, number of transferred bytes and packets, timestamp, duration of the communication, and URL or SNI for the HTTP and HTTPS connections, etc.), or the like. In some examples, endpoint telemetry is provided by lightweight connectors installed on client devices (e.g., laptops/PCs, tablets, smartphones, etc.).

In some examples, the detector(s) 212 may represent unimodal detectors that can implement various detection methods developed for individual modalities. Besides traditional rule-based systems which generate events based on matched hard-coded patterns, the detector(s) 212 may include anomaly detection algorithms or supervised classifiers. The large variety of anomaly detection methods applicable in the security domain can employ simple statistical detectors and/or probabilistic models. In some examples, pretrained variants of the detector(s) 212 may include random forest classifiers, artificial neural networks, or the like. Additionally, or alternatively, simpler and more computationally effective methods may be relevant because even weaker detections can contribute to the final detections produced by the final detector 218, which may represent a multi-modal detector.

In some examples, each one of the detector(s) 212 may transform a data source according to its needs and emit an event if triggering criteria are met. The detector(s) 212 may persist each event to a detection events store 220, where the event can be later evaluated by the final detector 218 to generate or otherwise determine a final security detection.

In some examples, and as described above, a same entity may be observed simultaneously in multiple modalities, represented by different identifiers. As such, the prime responsibility of the entity matching component 106 may be to link data sources together. In some instances, the entity matching component 106 may examine metadata about entities (e.g., stored in the entity metadata store 216) and the telemetry feeds (e.g., stored in the telemetry data store 214) to construct a unified view of the entities in the observed environment's local and global contexts. In some examples, the detector(s) 212 may process the telemetry records independently and potentially produce the events. At the same time, the entity matching component 106 may use the directory, inventory, and other metadata services to attempt to establish the relationships among the observed records. In examples, the entity matching component 106 may associate a user to their laptop, the laptop to the email and browser processes, their corresponding assigned network addresses, thus linking the telemetry and the generated events to a single entity. This entity is referred to as a cross-modal entity.

In the system 200, the entity matching component 106 may construct the mapping between endpoint IDs and IP addresses. In some examples, the entity matching component 106 algorithm may prefer precision over the completeness of IP space coverage, meaning that IP addresses used by multiple endpoints concurrently (e.g., endpoints located in different subnets with the same IP ranges) may be discarded. In some examples, the mapping may be used to associate detections from network modalities with given IP address and timestamp to the cross-modal entity.

In some examples, the final detector 218 may represent a multi-modal detector. The final detector 218 may be a component which operates on observations from bounded time windows and multiple modalities that were already associated with the cross-modal entity. In some examples, the final detector 218 may be as simple as a single rule mapping specific observation directly on a threat detection. For instance, this approach may be sufficient if the observation is already significant enough on its own. However, some threats may be identified with high probability only by correlation of multiple observations from multiple modalities. In these cases, the final detector 218 can be defined by a complex rule or set of rules. The rule itself may be explicit or encoded by, for instance, a neural network.

In some examples, the system 200 solves classification tasks on top of chronological and parametric item sets. These item sets may be labelled by threats based on some threat intelligence which may be represented by a set of malicious binaries or network domains, phishing e-mails, etc. In examples, the labeling may be associated with signature-based observations as well as extrapolated to the cross-modal entity. In such a scenario, the task may lead to a multi-label classification task. In some examples, the system 200 may include a user interface/application programming interface (UI/API) 222 for interacting with the system 200 and various components thereof.

Figure 3:
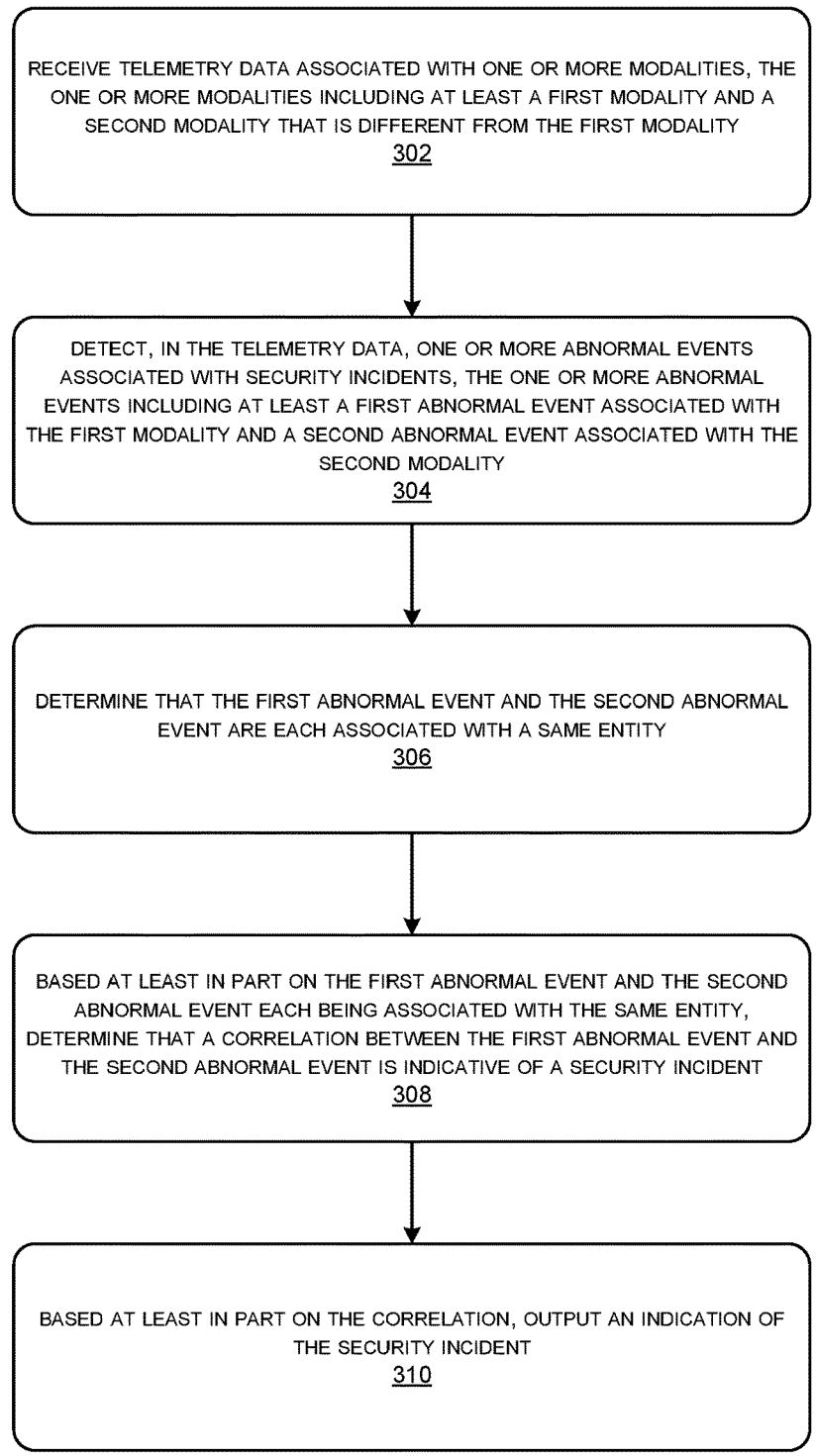
FIG. 3 is a flow diagram illustrating an example method associated with the threat detection techniques described herein.

FIG. 3 is a flow diagram illustrating an example method 300 associated with the threat detection techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes receiving telemetry data associated with one or more modalities, the one or more modalities including at least a first modality and a second modality, the second modality different from the first modality. For instance, the unimodal detectors 102 may receive the telemetry data 112 associated with the modalities 104. In some examples, the one or more modalities may further include a third modality, a fourth modality, a fifth modality, and so forth. In some examples, each modality may be different from each other. For instance, the first modality may be associated with a network connection log, the second modality may be associated with email activity logs, a third modality may be associated with endpoint logs, etc. In some examples, the telemetry data may comprise or be indicative of web proxy logs, file execution logs, firewall logs, network connection logs (e.g., Cisco's StealthWatch, NGFW, etc.), endpoint logs (e.g., binary executions, file changes from anti-virus engines, operating system logs, etc.), email activity logs, instant messaging logs, or the like.

At operation 304, the method 300 includes detecting, in the telemetry data, one or more abnormal events associated with security incidents, the one or more abnormal events including at least a first abnormal event associated with the first modality and a second abnormal event associated with the second modality. For instance, the unimodal detectors 102 may determine one or more detection events 114 that are associated with security incidents based at least in part on the telemetry data 112. In some examples, the one or more abnormal events may further include a third abnormal event associated with a third modality, a fourth abnormal event associated with a fourth modality, and so forth.

At operation 306, the method 300 includes determining that the first abnormal event and the second abnormal event are each associated with a same entity. For instance, the entity matching component 106 may determine that the entity associated with each one of the first abnormal event and the second abnormal event is a same entity to generate the entity-matched event(s) 116. In some examples, when abnormal events are detected, the different abnormal events may be assigned to an entity that they originated from. In some examples, the entities to which abnormal events may be assigned can include, but is not limited to, a specific server, a specific device, a specific user, a specific account (e.g., email or other user account), a specific group of devices, or the like. For instance, the abnormal events may be assigned based on a mapping between endpoint identifiers associated with the one or more modalities and network addresses associated with the entity.

At operation 308, the method 300 includes, based at least in part on the first abnormal event and the second abnormal event each being associated with the same entity, determining that a correlation between the first abnormal event and the second abnormal event is indicative of a security incident. For instance, the multi-modal detector 108 may determine that the correlation between the first abnormal event and the second abnormal event is indicative of the security incident. In some examples, the correlation may be strongly indicative of a presence of a security incident affecting the entity. Additionally, or alternatively, in some example a correlation may not exist between the abnormal events that is indicative of a security incident. In other words, these abnormal events that are not indicative of a security incident can be classified as otherwise normal behavior.

In some examples, machine-learned models and other machine-learning techniques may be utilized to determine whether multiple abnormal events associated with a same entity are indicative of a security incident. For instance, data associated with the abnormal events may be input, into a machine-learned model, and an output may be received from the machine-learned model indicating that the abnormal event(s) are indicative of an ongoing security incident.

At operation 310, the method 300 includes based at least in part on the correlation, outputting an indication of the security incident. For instance, the multi-modal detector 108 may output the one or more threat detection(s) 110 indicating the security incident(s). In some examples, the indication may be sent to network administrators associated with a company's network infrastructure so that corrective action can be taken.

Figure 4:
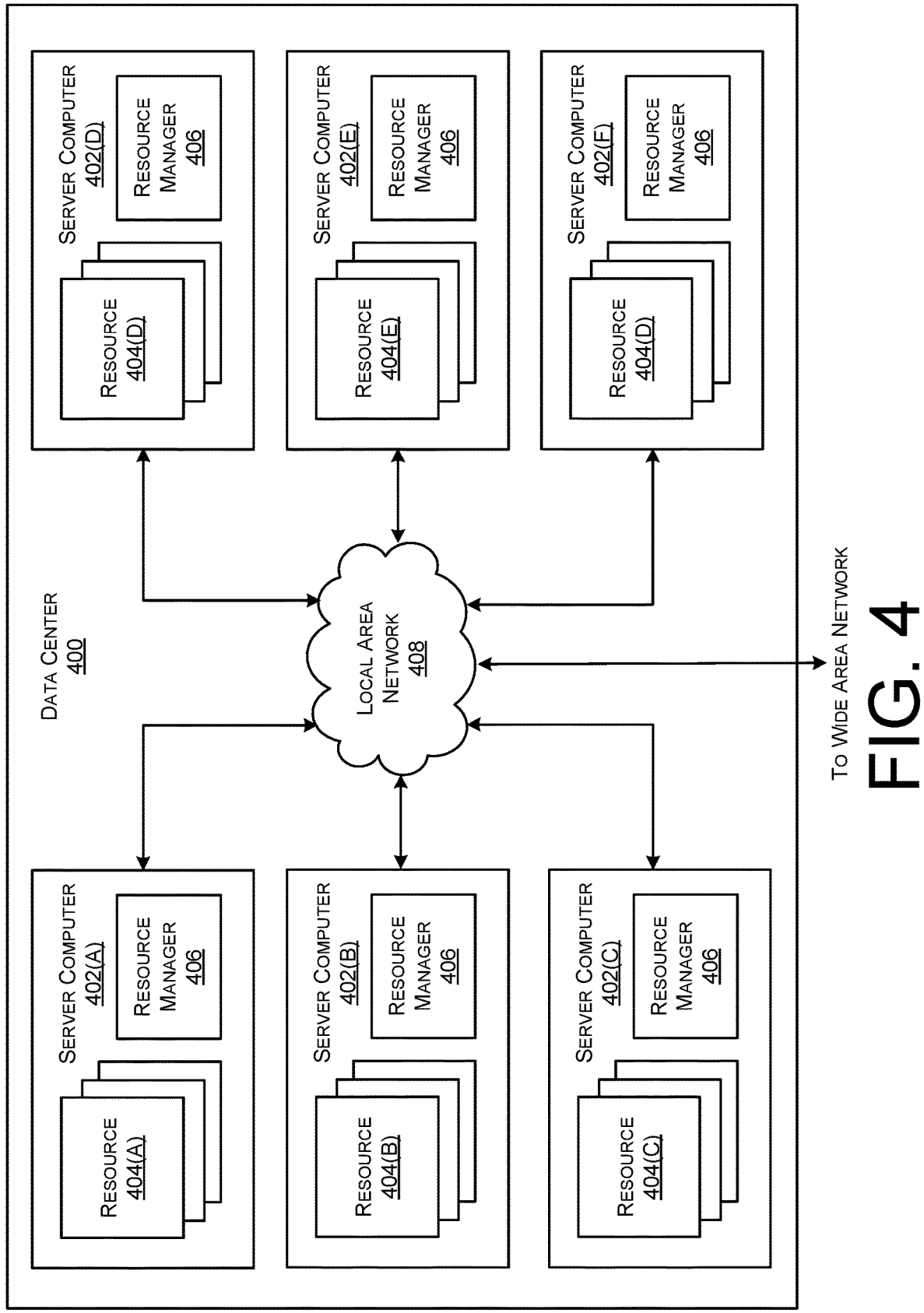
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked device or node described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
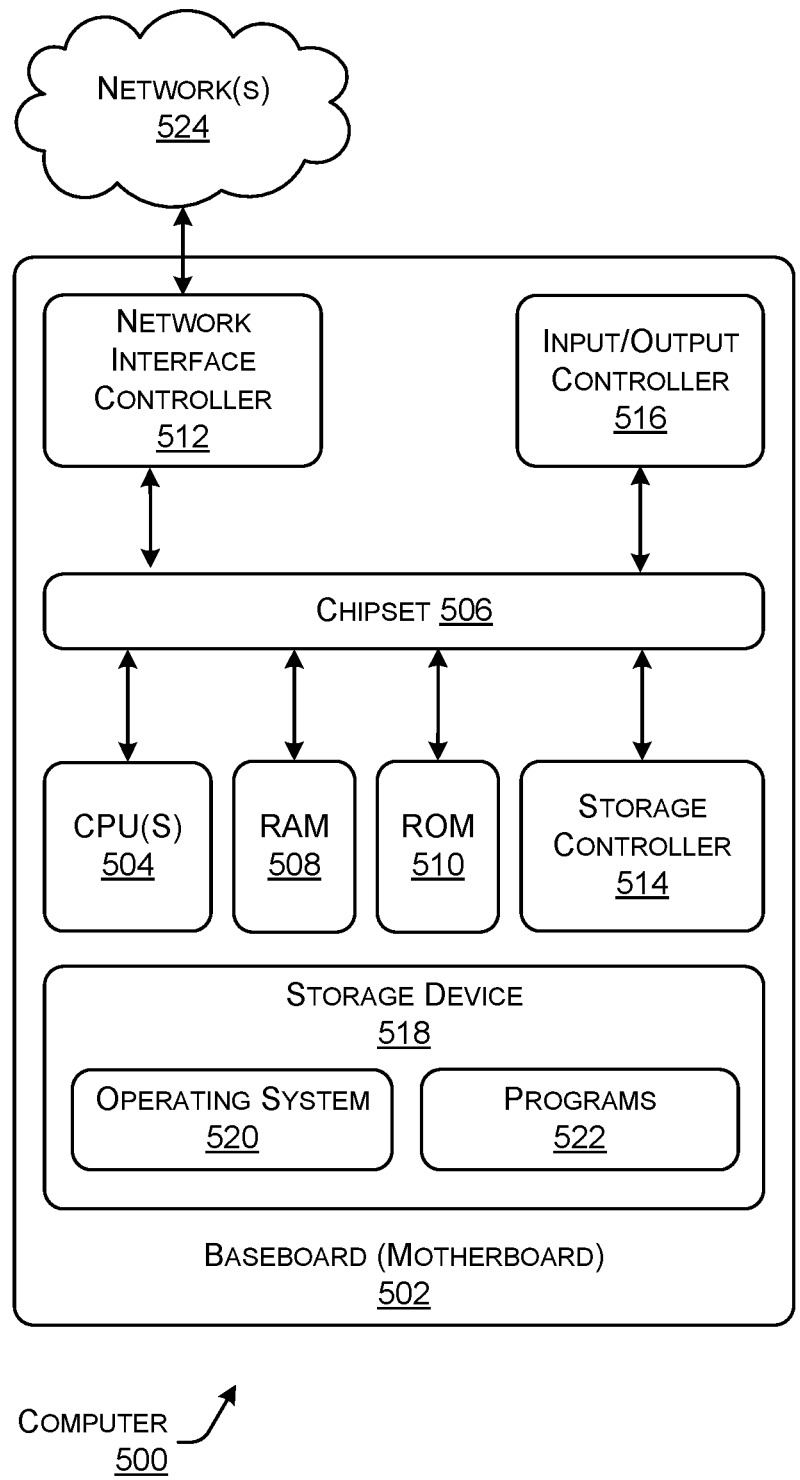
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., frontend node or backend node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network(s) 524. The chipset 506 can include functionality for providing network connectivity through a NIC 512, such as a gigabit Ethernet adapter. The NIC 512 is capable of connecting the computer 500 to other computing devices over the network(s) 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for combining detected events from different sources of data to provide a complete insight into cyber attack life cycles.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing instructions that, when executed by the one or more processors, cause the system to perform operations comprising:
   receiving telemetry data associated with one or more modalities, the one or more modalities including at least a first modality and a second modality, the second modality different from the first modality;
   detecting, in the telemetry data, one or more abnormal events associated with security incidents, the one or more abnormal events including at least a first abnormal event associated with the first modality and a second abnormal event associated with the second modality;
   determining a first mapping between a first endpoint identifier associated with the first modality and a network address associated with an entity;
   determining a second mapping between a second endpoint identifier associated with the second modality and the network address associated with the entity;
   determining, based at least in part on the first mapping and the second mapping, that the first abnormal event and the second abnormal event are each associated with a same entity;
   based at least in part on the first abnormal event and the second abnormal event each being associated with the same entity, determining that a correlation between the first abnormal event and the second abnormal event is indicative of a security incident; and
   based at least in part on the correlation, outputting an indication of the security incident.

2. The system of claim 1, wherein the telemetry data associated with the one or more modalities comprises at least one of:
   web proxy logs,
   file execution logs,
   firewall logs,
   network connection logs,
   endpoint logs,
   email activity logs, or
   instant messaging logs.

3. The system of claim 1, the operations further comprising:
   inputting, into a machine-learned model, first data associated with the first abnormal event and second data associated with the second abnormal event; and
   receiving, from the machine-learned model, an output indicating that the first abnormal event and the second abnormal event are indicative of the security incident.

4. The system of claim 1, wherein the first abnormal event is detected by a first unimodal detector that is specific to the first modality and the second abnormal event is detected by a second unimodal detector that is specific to the second modality.

5. The system of claim 1, wherein determining that the first abnormal event and the second abnormal event are each associated with the same entity comprises determining that the first abnormal event and the second abnormal event are each associated with a same server.

6. The system of claim 1, wherein determining that the first abnormal event and the second abnormal event are each associated with the same entity comprises determining that the first abnormal event and the second abnormal event are each associated with a same user device.

7. The system of claim 1, the operations further comprising:
   assigning the first abnormal event and the second abnormal event to the same entity; and
   determining the correlation between the first abnormal event and the second abnormal event based at least in part on the assigning.

8. The system of claim 1, the operations further comprising assigning the first abnormal event and the second abnormal event as originating from the same entity, wherein the entity is at least one of a specific device or a specific user.

9. A method comprising:
   receiving, from a first unimodal detector, first data associated with a first abnormal event, the first abnormal event detected by the first unimodal detector based at least in part on first telemetry data associated with a first modality;
   receiving, from a second unimodal detector, second data associated with a second abnormal event, the second abnormal event detected by the second unimodal detector based at least in part on second telemetry data associated with a second modality that is different from the first modality;
   determining a first mapping between a first endpoint identifier associated with the first modality and a network address associated with an entity;
   determining a second mapping between a second endpoint identifier associated with the second modality and the network address associated with the entity;
   determining, based at least in part on the first mapping and the second mapping, that the first abnormal event and the second abnormal event are each associated with a same entity;
   based at least in part on the first abnormal event and the second abnormal event each being associated with the same entity, determining that a correlation between the first abnormal event and the second abnormal event is indicative of a security incident; and
   based at least in part on the correlation, outputting an indication of the security incident.

10. The method of claim 9, wherein:
    the first data includes a first indication of an entity affected by the first abnormal event,
    the second data includes a second indication of an entity affected by the second abnormal event, and determining that the first abnormal event and the second abnormal event are each associated with the same entity is based at least in part on the first indication and the second indication.

11. The method of claim 9, wherein:
the first data includes a first timestamp associated with the first abnormal event,
the second data includes a second timestamp associated with the second abnormal event, and
determining that the correlation is indicative of the security incident is further based at least in part on the first timestamp and the second timestamp.

12. The method of claim 11, further comprising determining a length of a period of time between the first timestamp and the second timestamp, wherein determining that the correlation is indicative of the security incident is further based at least in part on the length of the period of time.

13. The method of claim 9, wherein the first telemetry data is different from the second telemetry data, the first telemetry data comprising at least one of:
web proxy logs,
file execution logs,
firewall logs,
network connection logs,
endpoint logs,
email activity logs, or
instant messaging logs.

14. The method of claim 9, further comprising:
inputting, into a machine-learned model, the first data associated with the first abnormal event and the second data associated with the second abnormal event; and
receiving, from the machine-learned model, an output indicating that the first abnormal event and the second abnormal event are indicative of the security incident.

15. The method of claim 9, wherein the first unimodal detector is specifically configured for the first modality and the second unimodal detector is specifically configured for the second modality.

16. The method of claim 9, wherein determining that the first abnormal event and the second abnormal event are each associated with the same entity comprises at least one of:
determining that the first abnormal event and the second abnormal event are each associated with a same server; or
determining that the first abnormal event and the second abnormal event are each associated with a same user device.

17. The method of claim 9, the operations further comprising assigning the first abnormal event and the second abnormal event as originating from the same entity, wherein the entity is at least one of a specific device or a specific user.

18. One or more non-transitory computer-readable media storing instructions that, when executed, cause one or more processors to perform operations comprising:
receiving, from a first unimodal detector, first data associated with a first abnormal event, the first abnormal event detected by the first unimodal detector based at least in part on first telemetry data associated with a first modality;
receiving, from a second unimodal detector, second data associated with a second abnormal event, the second abnormal event detected by the second unimodal detector based at least in part on second telemetry data associated with a second modality that is different from the first modality;
determining a first mapping between a first endpoint identifier associated with the first modality and a network address associated with an entity;
determining a second mapping between a second endpoint identifier associated with the second modality and the network address associated with the entity;
determining, based at least in part on the first mapping and the second mapping, that the first abnormal event and the second abnormal event are each associated with a same entity;
based at least in part on the first abnormal event and the second abnormal event each being associated with the same entity, determining that a correlation between the first abnormal event and the second abnormal event is indicative of a security incident; and
based at least in part on the correlation, outputting an indication of the security incident.

19. The one or more non-transitory computer-readable media of claim 18, wherein:
the first data includes a first indication of an entity affected by the first abnormal event,
the second data includes a second indication of an entity affected by the second abnormal event, and
determining that the first abnormal event and the second abnormal event are each associated with the same entity is based at least in part on the first indication and the second indication.

20. The one or more non-transitory computer-readable media of claim 18, wherein:
the first data includes a first timestamp associated with the first abnormal event,
the second data includes a second timestamp associated with the second abnormal event, and
determining that the correlation is indicative of the security incident is further based at least in part on the first timestamp and the second timestamp.

* * * * *